No. 706,336. Patented Aug. 5, 1902.
D. NICKEL.
CASTER.
(Application filed Nov. 23, 1901.)
(No Model.)
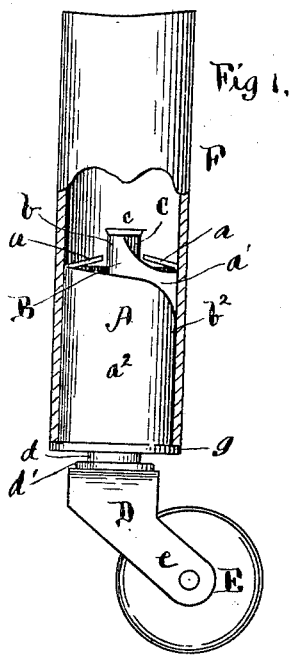
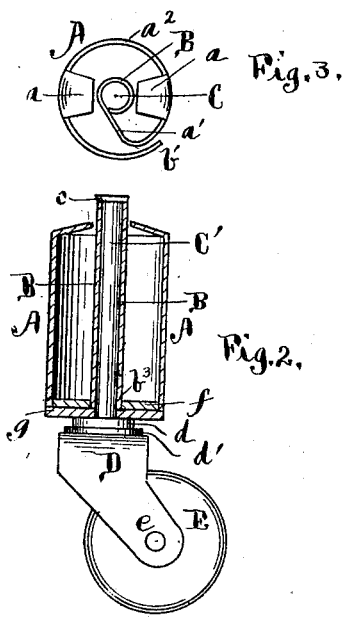
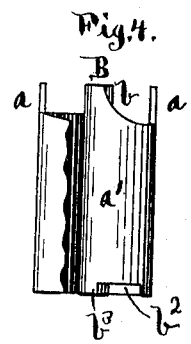
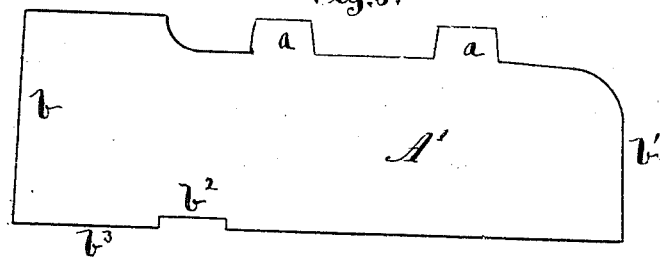
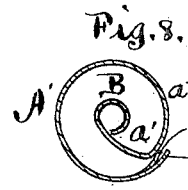
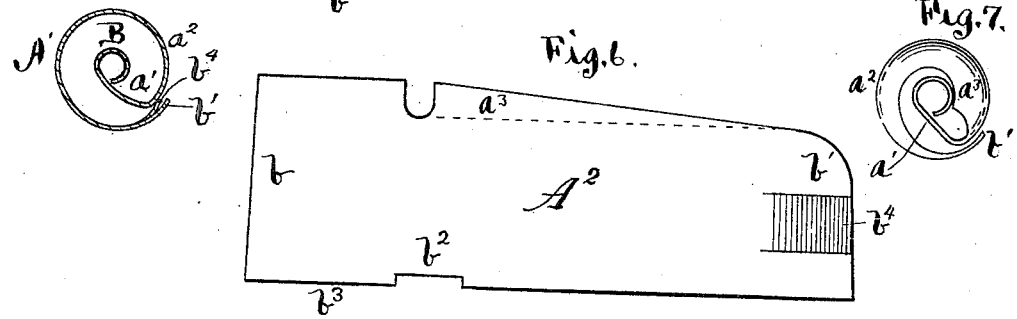
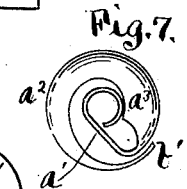
Witnesses:
Samuel W. Banning.
Oscar W. Bond.
Inventor:
David Nickel.
By Banning & Banning,
Attys.
THE NORRIS PETERS CO., PHOTO-LITHO., WASHINGTON, D. C.

UNITED STATES PATENT OFFICE.

DAVID NICKEL, OF MORRIS, ILLINOIS, ASSIGNOR TO NICKEL MANUFACTURING COMPANY, OF MORRIS, ILLINOIS.

CASTER.

SPECIFICATION forming part of Letters Patent No. 706,336, dated August 5, 1902.

Application filed November 23, 1901. Serial No. 83,364. (No model.)

*To all whom it may concern:*

Be it known that I, DAVID NICKEL, a citizen of the United States, residing at Morris, in the county of Grundy and State of Illinois, have invented certain new and useful Improvements in Casters, of which the following is a specification.

The objects of this invention are to construct a simple, reliable, and efficient retainer or retaining-spring for casters that will be inexpensive to manufacture, strong and durable in use, adapted to sockets of varying diameters, and readily inserted into place or removed therefrom and when inserted furnish practically a continuous side support for the caster in its socket by which the caster will be held firmly and rigidly in place, and to improve generally the construction and operation of the caster as a whole; and the invention consists in the features of construction and combination of parts hereinafter described and claimed.

In the drawings illustrating the invention, Figure 1 is a side elevation showing the socket partly in section with the caster therein; Fig. 2, a side elevation of the caster with the retainer or retaining-spring in section; Fig. 3, a top or plan view of the retainer or retaining-spring; Fig. 4, a side elevation of the retainer or retaining-spring partly broken away; Fig. 5, a view of the blank from which the preferred form of retainer or spring is made; Fig. 6, a modified form of blank; Fig. 7, a plan view of a retainer or retaining-spring made from the blank of Fig. 6, and Fig. 8 a cross-sectional view of Fig. 7.

The retainer or retaining-spring A of the invention in the preferred form therefor is made from a blank A' (shown in Fig. 5) of sheet-steel or other material of a spring or elastic nature. This blank is cut to have on one edge two lips or tips $a$, which when the blank is rolled into shape form two stops or stays opposite each other. One end $b$ of the blank is left the full width, and the opposite end $b'$ is cut away to be of a less width, and the straight edge of the blank has therein a notch or recess $b^2$, which when the blank is rolled into its final shape forms a projecting tubular end or guide $b^3$ for the sleeve. The retainer or retaining-spring A is made from this blank by rolling the same into a shape for its wide end $b$ to form a central sleeve B for the reception and retention of the pintle or spindle of the caster and to have the body of the spring or spring-retainer in the shape of a coil or convolute with a web $a'$ extending laterally from the sleeve and a spiral body or wall $a^2$, leaving the end $b'$ free to furnish a contacting side or face to impinge against the inner face of the wall of the socket when the retainer or retaining-spring is in place in the socket and hold the caster as a whole in firm, secure, and positive engagement with the socket F, which may be the foot of a tubular bedpost or other appliance or device with which the caster is to be used. The sleeve B is entered onto the pintle or spindle C and is held in place at the top against endwise movement by upsetting or riveting down the end of the pintle or spindle to form a head $c$, which abuts against the end of the sleeve, and after the retainer or retaining-spring has been attached to the pintle or spindle the stops $a$ are bent inwardly and form stays to limit the inward or lateral thrust of the body of the retainer or retaining-spring and to furnish a side support at the upper end, which in conjunction with the sleeve and the web furnishes a guard against lateral swing of the pintle or spindle, thereby insuring great firmness and rigidity at the upper end against lateral displacement of the sleeve and the pintle or spindle in use. The pintle or spindle C fits within the sleeve, and its lower end is entered into the top plate of the fork or yoke D of the caster, in which fork or yoke is mounted the caster-wheel E on an axle $e$, as usual, and, as shown, a washer $d'$ is located between the top plate and a collar or flange $d$ on the pintle or spindle, so as to give a strong and free attachment of the fork or yoke to the pintle or spindle. A circular plate or disk $f$ fits within the lower end of the retainer or retaining-spring and within the recess $b^2$ in the web $a'$ and has entered into its center hole the end $b^3$ of the pintle or spindle and serves to hold the lower end of the wall of the retainer or retaining-spring distended, performing, in effect, the same office as the stops or stays $a$, thereby insuring the maintenance of the sleeve and the pintle or spindle in vertical alinement and against lateral movement. A washer $g$ encircles the pintle outside of the retaining-spring and serves as a base or support therefor, closing the opening and forming with the socket F a neat and firm support. The distending plate or disk and the exterior washer are, as shown, composed of two separate pieces; but it is obvious that they may be formed of a single piece without varying in any way the character of their use. The spiral formation of the retaining-spring allows it to be screwed or turned into place in the socket and, furthermore, allows it to be compressed in diameter until the stops are brought in firm contact with the sleeve, at which point the limit of its compression is reached.

In Figs. 7 and 8 a modified form of retainer or retaining-spring is shown, made from the blank shown in Fig. 6. The blank $A^2$ has one edge cut on an incline from the inner terminus of its wide end to its narrow end, and this edge is to be turned at right angles to the body, forming an inwardly-projected tapered edge $a^3$, which performs the office of the two stops $a$, heretofore described, in furnishing a lateral support for the sleeve and the pintle or spindle. The blank of Fig. 6 is slotted at its smaller end to form a tongue $b^4$, which can be turned or bent to furnish, after the retainer or retaining-spring is formed, a contact to bear against the outer face of the wall $a^2$ of the retainer or retaining-spring, as shown in Fig. 8, when in its socket F for holding the retainer or retaining-spring under pressure and tension within the socket. The slotted end of the blank and tongue $b^4$, formed therewith, are shown in connection with the blank of Fig. 6; but it is obvious that the blank of Fig. 5 could be slotted and provided with a tongue $b^4$ in the same manner and for the same purpose.

The efficiency of this invention lies in the fact that the spring may be entered into the socket by a twisting or screwing motion, which serves at the same time to slightly compress its walls, thereby holding the same in compression within the socket and preventing its displacement by accident or otherwise. The base-plate prevents the caster from being driven too far into the socket and at the same time closes the opening and adds to the appearance of the device. The parts are simple and inexpensive to manufacture, and the danger of destruction or injury is very slight. The sleeve for the pintle or spindle is a component part of the retainer and gives the retainer a bearing for its full length, and the retainer also has a bearing for its full length and its entire diameter within its socket, rendering the jointure between the caster and its socket strong and firm. The pintle or spindle is free to revolve and will be held in a vertical position within the retainer by the stops at the top and bottom, which prevent side play in use.

What I regard as new, and desire to secure by Letters Patent, is—

1. A retaining-spring for casters, consisting of a tubular body formed from a plate of springy material to have one end of the plate overlap the outer wall of the body and freely contact therewith, a sleeve within the body, and a web between the wall and the sleeve, substantially as described.

2. A retaining-spring for casters made from a single plate of springy material, consisting of a tubular body formed to have one end of the plate overlap the outer wall of the body and freely contact therewith, a sleeve within the body, and a web between the wall and the sleeve, substantially as described.

3. A retaining-spring for casters made from a single plate of springy material spirally bent or coiled to form a sleeve and further bent or coiled in the same direction to form a wall or body, and a web between the sleeve and the wall or body with the outer end of the plate free to allow of compression, substantially as described.

4. A retaining-spring for casters made from a single plate of springy material bent or coiled to form a sleeve and further bent or coiled to form a wall or body provided with a stop on its upper edge bent inward toward the sleeve, and a web between the sleeve and the wall or body with the outer end of the plate free to allow of compression, substantially as described.

5. A retaining-spring for casters made from a single plate of springy material bent or coiled to form a sleeve and further bent or coiled to form a wall or body, and a web between the sleeve and the wall or body provided in its lower edge with a recess the outer end of the plate being free to allow of compression, substantially as described.

6. A retaining-spring for casters made from a single plate of springy material bent or coiled to form a sleeve and further bent or coiled to form a wall or body provided with stops bent inward toward the sleeve, and a web between the sleeve and the wall or body provided in its edge with a recess the outer end of the plate being free to allow of compression, substantially as described.

7. The combination of a retaining-spring for casters made from a single plate of springy material bent or coiled to form a sleeve and further bent or coiled to form a wall or body, a web between the sleeve and the wall or body, provided in its edge with a recess the outer end of the plate being free to allow of compression, and a distending-washer encircling the sleeve and lying within the recess in the web, substantially as described.

8. In combination with a caster, of a retaining-spring therefor made from a single piece of springy material bent or coiled to form a sleeve and further bent or coiled to form a wall or body having its outer free edge curved or rounded at its upper corner, a web between the sleeve and the wall or body provided in its edge with a recess, a distending-washer encircling the sleeve and lying within the recess in the web, and a pintle carrying a roller and journaled within the sleeve, substantially as described.

9. In combination with a caster, of a retaining-spring therefor made from a single piece of springy material bent or coiled to form a sleeve and further bent or coiled to form a wall or body, a web between the sleeve and the wall or body provided in its edge with a recess, a distending-washer encircling the sleeve and lying within the recess in the web, a pintle carrying a roller and journaled within the sleeve, and an exterior washer encircling the pintle and lying outside of the retaining-spring, substantially as described.

10. An essentially oblong blank for the formation of a retaining-spring for casters with one end of greater width than the other having a recess in its lower edge and having, in its upper edge near the wider end, a cut allowing a portion of its upper edge to be turned inwardly and furnish a stop or abutment when the blank is formed into a sleeve and spring, substantially as described.

11. A blank for the formation of a retaining-spring for casters oblong in general outline having the upper edge of one of its ends curved or rounded and having a recess in its lower edge and having two ears on its upper edge adapted to be inwardly turned furnishing stops or abutments when the blank is formed into a sleeve and spring, substantially as described.

DAVID NICKEL.

Witnesses:
T. H. HALL,
O. W. BOND.